Aug. 5, 1952 N. MORRIS 2,606,271
ELECTRIC HEATER AND THERMOSTATIC CONTROL MEANS THEREFOR
Filed July 14, 1949 4 Sheets-Sheet 1
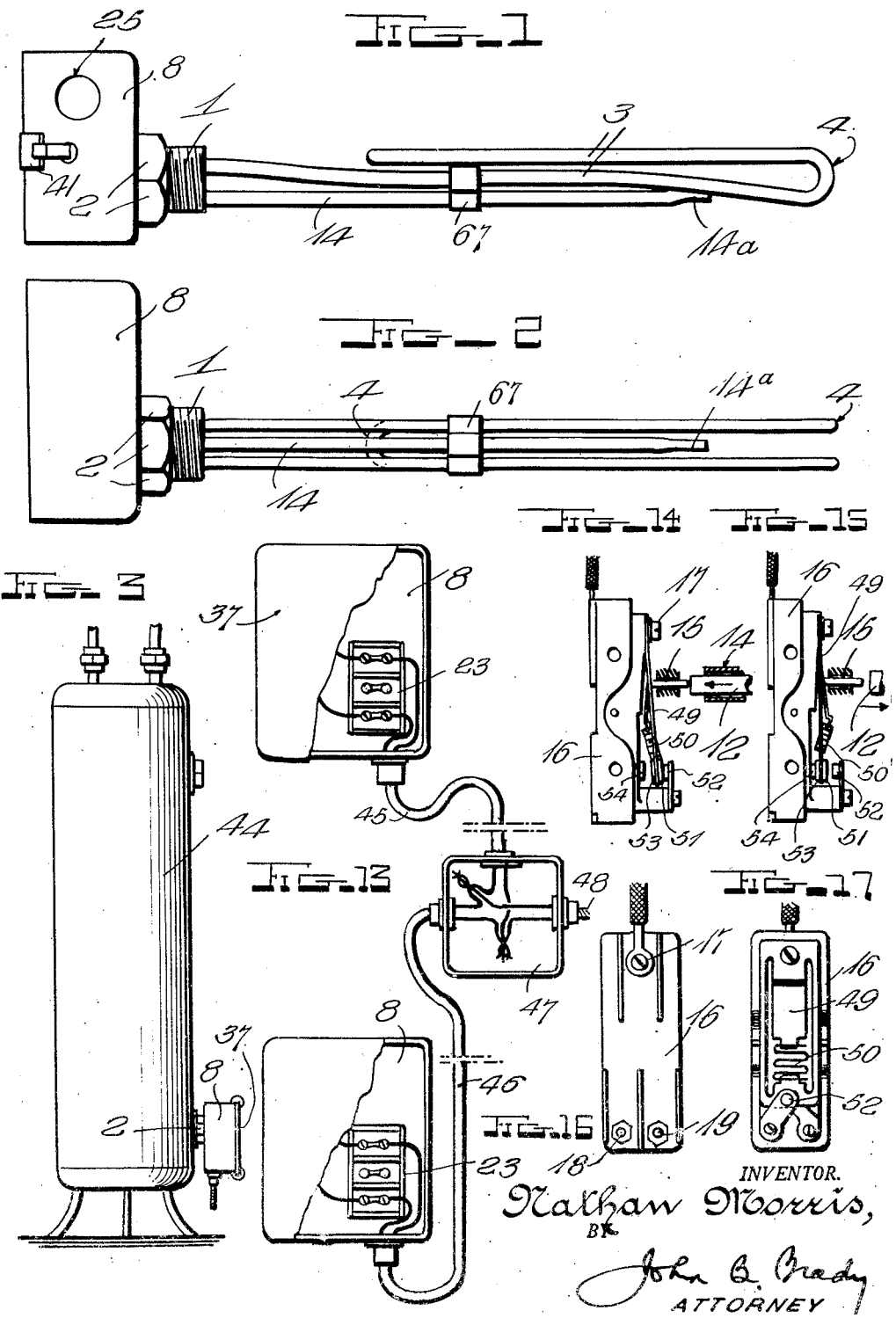
INVENTOR.
Nathan Morris,
BY John B. Brady
ATTORNEY

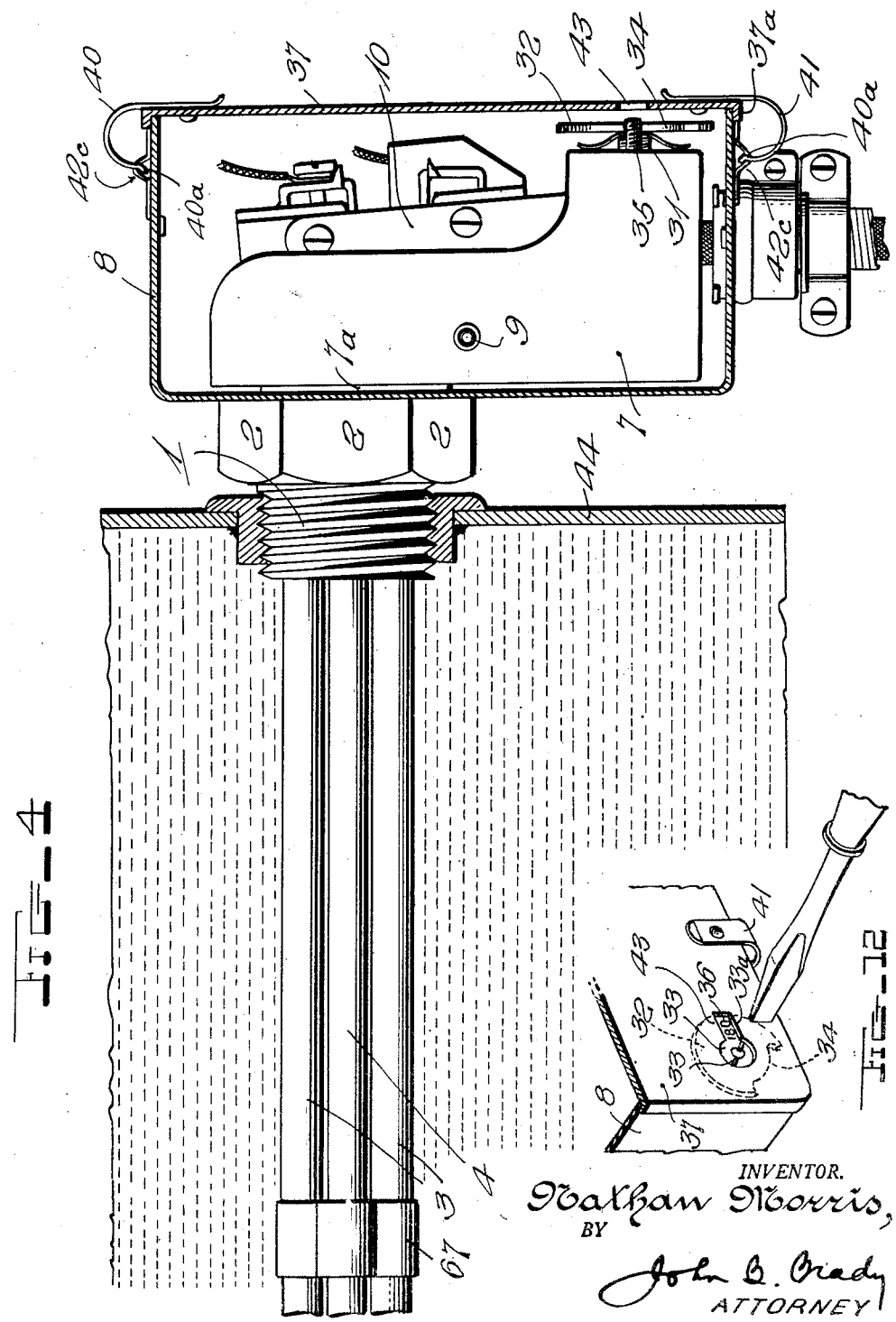

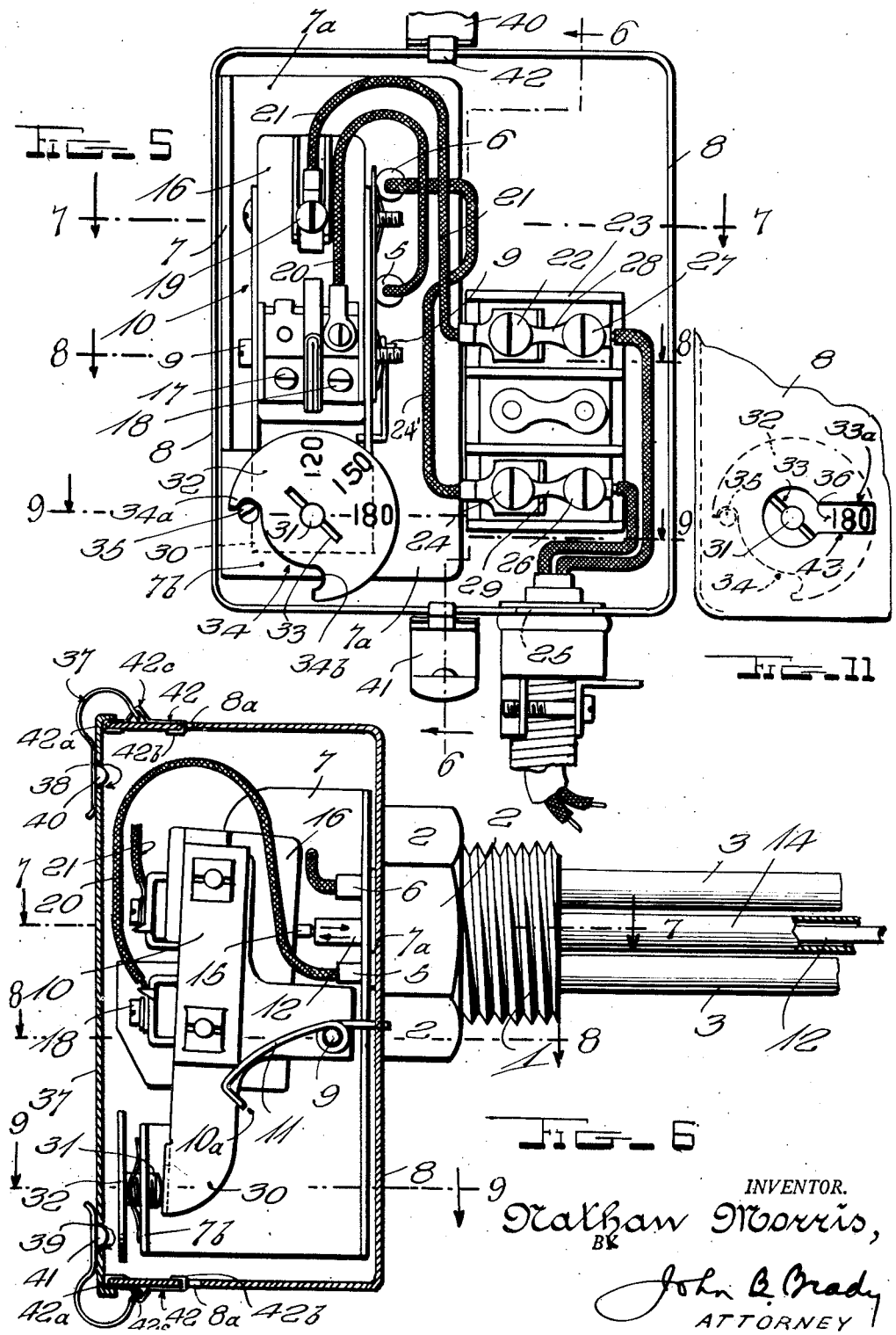

Aug. 5, 1952 N. MORRIS 2,606,271
ELECTRIC HEATER AND THERMOSTATIC CONTROL MEANS THEREFOR
Filed July 14, 1949 4 Sheets-Sheet 4
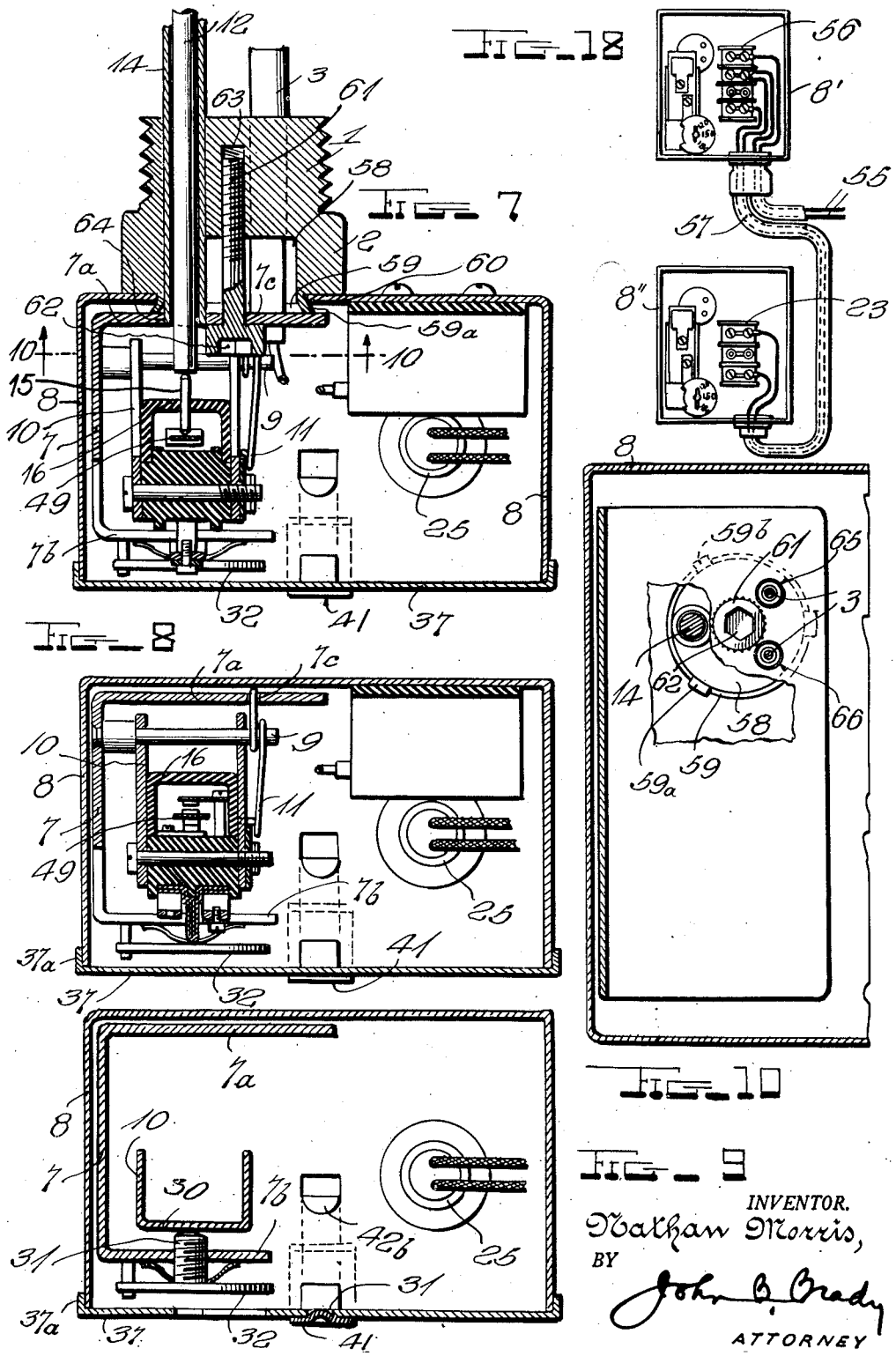
INVENTOR.
Nathan Morris,
BY
John B. Brady
ATTORNEY Patented Aug. 5, 1952

2,606,271

UNITED STATES PATENT OFFICE 2,606,271

ELECTRIC HEATER AND THERMOSTATIC CONTROL MEANS THEREFOR

Nathan Morris, Silver Spring, Md., assignor to American Instrument Company, Inc., Silver Spring, Md., a corporation of Maryland Application July 14, 1949, Serial No. 104,615

9 Claims. (Cl. 219—38)

My invention relates broadly to electrical heating, and more particularly to a construction of a thermostatically controlled electric heater which is readily applicable to existing types of water tanks.

One of the objects of my invention is to provide a compact assembly of electrical heater and thermostatically controlled switch therefor, which may be readily installed in existing types of water tanks.

Another object of my invention is to provide a construction of electrical heater for installation in water tanks, in which the header carried by the heater forms a casing enclosing a thermostatically controlled switch, and in which the entire assembly is provided with a screw-threaded plug connection for making direct connection with a screw-threaded opening in a tank, thereby permitting quick installation of the heater unit in the tank and connection thereof to a domestic electric power circuit with precision temperature control thereof through operation of the thermostatic switch.

Still another object of my invention is to provide a compact construction of thermostatically controlled electric heater for installation through the wall of a tank, including means for adjusting the thermostatically controlled switch for operation at a predetermined temperature set for ensuring energization of the heater whenever the water within the tank falls below a predetermined temperature.

Still another object of my invention is to provide a construction of composite thermostatically controlled switch and electrical heater with a terminal box associated therewith, and adapted for connection in a power circuit whereby a constant supply of hot water may be assured without dependence upon furnace operation.

A still further object of my invention is to provide a construction of composite longitudinally extending thermostat and adjacent metallic encased heating element having a heat conducting band interconnecting the thermostat and the metallic encased heating element, for providing a heat flow path from the heating element to the thermostat where the width of the band is selected of a size sufficient to conduct heat from the heating element to the thermostat under conditions where the level of the water might drop below the heating element, to ensure cutoff of the heating element and prevent destruction thereof under conditions of excessive heating.

Other and further objects of my invention reside in a compact construction of heater unit and thermostatically controlled switch, as set forth more fully in the specification hereinafter following, by reference to the accompanying drawings, in which:

Figure 1 is a side elevational view of the electric heater of my invention ready to be installed in a water tank; Fig. 2 is a top plan view of the electric heater illustrated in Fig. 1; Fig. 3 is a schematic view showing the electric heater installed in a water tank; Fig. 4 is an enlarged vertical sectional view through the casing which encloses the control switch, and showing in side elevation the electric heater extending from the casing through the side wall of the water tank; Fig. 5 is an elevational view looking into the interior of the casing and showing the control switch and the terminal block for establishing the power circuit connections; Fig. 6 is a vertical sectional view taken through the casing substantially on line 6—6 of Fig. 5, and showing the coaction of the control switch with the thermostat; Fig. 7 is a transverse sectional view taken substantially on lines 7—7 of Figs. 5 and 6; Fig. 8 is a transverse sectional view taken substantially on lines 8—8 of Figs. 5 and 6; Fig. 9 is a transverse sectional view taken substantially on lines 9—9 of Figs. 5 and 6; Fig. 10 is a fragmentary top plan view of the supporting bracket for the control switch partially broken away and illustrated partially in section to show the manner of securing the electric heater to the casing; Fig. 11 is a fragmentary front elevational view looking through the cover of the casing and illustrating the calibrated dial for adjusting the operating position of the control switch; Fig. 12 is a fragmentary perspective view of the front of the casing, showing the adjustable calibrated dial and the manner of effecting a pre-setting thereof from the exterior of the casing; Fig. 13 is a schematic view illustrating the manner of connecting a two-heater installation in a tank where both heaters can operate at the same time; Fig. 14 is a side elevational view showing the coaction of the thermostat and the control switch, where the thermostat is shown in expanded position; Fig. 15 is a view similar to the view shown in Fig. 14, but illustrating the position of the control switch when the thermostat is in retracted position; Fig. 16 is a front elevational view of the housing of the control switch illustrated in Figs. 14 and 15; Fig. 17 is an elevational view of the control means for the control switch illustrated in Figs. 14–16, and Fig. 18 shows the manner of connecting a two heater installation where only one heater is permitted to operate at the same time in order to meet local regulations.

My invention is directed to a compact assembly of thermostatically controlled electric switch and an electric heater in which the thermostat and electric heater terminate in a plug which may be readily installed through a screw-threaded opening in the wall of a tank. The screw-threaded plug carries a housing on the end thereof. The housing forms an enclosure for a terminal plug and an angularly shiftable electric circuit controller. The angularly shiftable electric circuit controller is actuated by the expansion and contraction of the thermostat which is associated with the electric heater. The electric circuit controller is maintained under tension and is adjustable in angular position with respect to the thermostat, so that the electric circuit controller may be closed at the instant that the thermostat has contracted to a physical length corresponding to the temperature condition within the tank. Closing of the electric circuit controller operates to apply heating current to the electric heater, which condition is maintained so long as the temperature of the water is below the temperature at which the thermostat and coacting electric circuit controller are cooperatively set. When, however, the temperature of the water rises above the predetermined set temperature, the expansion of the thermostat angularly shifts the electric circuit controller to a position opening the power supply circuit to the heater, thereby de-energizing the heater. This condition prevails until the temperature of the water falls below the predetermined storage temperature, whereupon contraction of the thermostat operates to close the electric circuit controller, again energizing the electric heater from the power supply circuit for heating the water within the tank. The construction of the composite heater control switch and thermostat of my invention is such that a multiple number of units may be applied to a tank and controlled to operate simultaneously or successively. The heater construction of my invention is particularly applicable for domestic hot water tanks where the units may be readily applied through a screw-threaded opening at the side of the tank simply by use of an open end wrench, monkey wrench, or adjustable end wrench having jaws which are not over ½ inch thick, in order to engage the hexagonal faces provided on the plug interconnecting the heater and thermostat with the terminal box.

One of the problems involved in domestic hot water tank installations is the ever-present danger of the water level dropping below the electrical heating element and uncovering the electrical heating element, for under these conditions the thermostat adjacent the electrical heating element no longer receives heat by conduction through the water, but must depend upon radiation, which has been found insufficient to prevent destruction of the heating element by burning out under conditions of excessive temperature. Accordingly, I have applied a thermal link between the thermostat and the metallic casing of the electrical heating element. This link is in the form of a thermally conductive metallic band which I have found must have a very critical width. The thermally conductive band must not be too wide, as it would then conduct too much heat whereupon the control switch in the terminal box would cycle too frequently. However, the width of the link must be sufficient to give protection to the heater by providing a heat flow path upon too rapid a rise in temperature of the electrical heating element due to such contingencies as the uncovering of the electrical heating element by the falling water level in the tank. Accordingly, I have evolved a construction of metallic band having a width substantially equal to the diameter of the thermostat and the diameter of the tubular casing housing the electrical heating element, with a spacial distance between the thermostat and the metallic casing of the electrical heating element not exceeding the diameter of the casing of the electrical heating element. With this proportion, I have found that the critical contact area of the thermal link is sufficient to prevent too rapid cycling of the thermostat, and at the same time give protection to the electrical heating element.

The construction of my invention has been found to be highly practical and relatively inexpensive in mass production, and highly efficient in electrical operation. My invention has been described herein as particularly applicable to automatic maintenance of desired temperature in domestic hot water heaters, but it is to be understood that the heater and control unit of my invention is applicable in tank installations generally wherever a fluid is to be maintained at an even temperature.

Referring to the drawings in more detail, the structure employs a screw-threaded, tapered plug 1 having a hexagonal set of flat wrench engaging surfaces 2. The electric heater is of the internally wound, metallic encased, tubular type which I have represented by metallic tube 3, which is looped upon itself as represented at 4, with the ends thereof extending through the screw-threaded plug 1 and terminating at 5 and 6 beyond the base of the bracket member 7 mounted interiorly of the housing 8. The bracket 7 has a flat base portion 7a, which coacts with the end of the plug 1, through which the tubular heater 3 extends, for clamping the housing 8 in position between bracket 7 and plug 1.

The bracket 7 is substantially U shaped in section, having a lateral projection 7b extending in spaced parallel relation to the base 7a of the bracket. Intermediate the projection 7b of the base 7a of the bracket 7, I provide a transversely extending pin 9 which provides a pivot means about which the cradle 10 rocks. The cradle 10 is spring biased by means of spring member 11 which engages beneath the cradle at the position I have indicated at 10a, and encircles the pin 9 and enters a socket 7c provided in the base 7a on bracket 7. Spring 11 tends to rock the cradle 10 in a clockwise direction when viewed as in Fig. 6. The limit of movement of cradle 10 in a clockwise direction is governed by the expansion and contraction of the thermostat, which I have indicated generally at 12. The thermostat 12 is in the form of a rod housed within casing 14, which connects with the end of the thermostat as indicated at 14a. The end of the thermostat 12 engages the operating plunger member 15 of the switch housing 16. The switch housing 16 is carried by the cradle 10 with the operating plunger member 15 extending externally therefrom and engaging the longitudinally extending end of the thermostat 12.

The switch housing 16 is formed from insulation material which contains a spring biased switch of miniature size of the microswitch construction. The operating plunger member 15 of the microswitch controls the closing and opening of contacts within the microswitch housing 16, depending upon the expansion or contraction of thermostat 12. The housing 16 is provided with terminal connectors 17, 18, and 19 on the top thereof, connected to contacts within the housing of the microswitch 16. The flexible conductive lead 20 extends from the end of the electric heating element 5 to the terminal connection 18 on housing 16. The flexible lead 21 extends from terminal connector 19 on housing 16 to the terminal 22 on terminal block 23. The other end of the electric heating element at 6 connects through flexible lead 24' with terminal 24 of terminal block 23. A standard B. X. cable extending from the domestic power supply circuit extends through opening 25 in the end wall of housing 8, for establishing power supply connections to terminals 26 and 27, which are connected through busses 28 and 29 with terminals 24 and 22 respectively. Thus, the domestic power supply may be connected to the electric heating element 3 in accordance with the control afforded by the expansion and contraction of thermostat 12, and its effect upon operating plunger member 15 of the switch 16.

The cradle 10 is provided with a transverse end portion 30, providing an abutment surface against which the micrometer adjusting screw 31 abuts. The micrometer adjusting screw 31 extends through the lateral projection 7b of the bracket 7, and terminates in a dial-like head 32. The dial-like head 32 has a tool engaging diametrically aligned slot 33 therein, and has a peripheral cutaway portion 34, enabling the dial-like head to be moved through an angular distance limited by abutment of the opposite ends 34a and 34b of the cutaway portion 34 with the pin 35 which extends normally from the lateral projection 7b of bracket 7. The dial-like head 32 carries calibrations thereon, which in this instance I have indicated as three in number, designated at 36 as 180, 150, and 120. These calibrations provide an indication for the setting of the thermostat control device for operation at temperatures of 120°, 150°, or 180°.

In domestic hot water installations maximum economy is secured by setting the water temperature at 150° F. Lower water temperatures are less costly as less electric power is consumed. I have found that a two thousand watt heater will heat a gallon of water from 50° F. to 150° F. in approximately seven minutes.

By adjusting the dial 32 to the desired angular position, the cradle 10 is moved to that position at which the expansion of the thermostat 12 will actuate the operating plunger member 15 of the microswitch 16 for operation at the required temperature.

The housing 8 forming the terminal box is provided with a cover 37 having a peripheral edge 37a engaging the peripheral edge of the housing 8. The cover 37 is apertured adjacent opposite ends as represented at 38 and 39, into which snap fasteners 40 and 41 are arranged to move. Snap fasteners 40 and 41 are each attached to the opposite slots of the terminal box 8 by special fastenings. These special fastenings comprise a strip member 42, the end 42a of which is engaged over the peripheral edge of housing 8, and the opposite end 42b of which extends through aperture 8a in housing 8. The strip 42 has an intermediate outstruck portion 42c, in which the end 40a of the snap fastener 40 is hingedly connected. This arrangement facilitates quick removal of the cover 37, permitting inspection and repairs to components within the housing. An aperture 43 in the cover 37 is aligned with the diametrical slot 33 in dial 32, permitting setting of the temperature at which the switch operates, without opening the housing. By engaging the slot 33 with a tool such as a screwdriver, the dial 32 is revolved until the calibration representing the temperature at which the switch is to be set becomes visible through the elongated portion 33a of the aperture 33.

In Fig. 3 I have represented the manner in which the completely assembled heater unit with terminal box thereon, is installed in a tank simply by use of an open end wrench, monkey wrench, or adjustable end wrench which is applied to the hexagonal nut faces 2 and the entire assembly screwed into position within the side wall of tank 44. It is important that no pressure be applied to the housing 8, as springing or opening of the housing box may change temperature setting of the thermostat or loosen the box from the heater elements.

Two heater installations may be provided in a tank where both heaters can operate at the same time, as shown in the arrangement set forth in Fig. 13. In this arrangement two of the housings 8 containing the terminal blocks 23 and the heater and thermostat installations as set forth in Figs. 1–12 are connected through cables 45 and 46 with a central terminal box 47, in which position the power leads are connected in parallel to the central power leads 48 for insuring the multiple operation of the two heaters.

In Figs. 14–17 I have shown in detail the arrangement of control switch employed in the heater and thermostat combination. Fig. 14 shows the thermostat 12 in expanded condition applying pressure to plunger member 15 which abuts the switching member 49. Switching member 49 flexes under control of operating plunger 15, shifting the substantially sinusoidal resilient strip member 50 to a position in which contact 51 is shifted into electrical connection with fixed contact 52. When the thermostat 12 contracts as illustrated in Fig. 15, plunger member 15 withdraws the pressure upon switch member 49, whereby the substantially sinusoidal resilient strip member 50 flexes the switch member 49 displacing contact 51 away from contact 52 and establishing connection between contact 53 carried by the switch member with fixed contact 54. Thus, the expanded and contracted condition of thermostat 12 directly controls the electrical connections through the contact system controlled by the switch member for governing the cutting on or cutting off of the electric heater.

For a two heater installation where only one heater can operate at a time, the power circuit is connected as shown in Fig. 18. In this arrangement the two housings 8' and 8" are connected for alternate operation from the central power source connected to leads 55 connected to terminal block 56 in housing 8'. By internal wiring in housing 8' the normal operation of the thermostat controlled heater associated with housing 8' is carried on, and when the cut off operation occurs by expansion of the associated thermostat in the condition illustrated in Fig. 14, the circuit is completed through contacts 51 and 52 through the leads 57 extending to housing 8" and to the terminal block 23 therein. Operation of the thermostat and heater in housing 8" is carried out after the heater in housing 8' completes its operation. This wiring arrangement is used where local regulations do not allow two heaters to operate at one time.

The assembly of the heater and thermostat unit of my invention is set forth more clearly in Figs. 7-10 wherein the tapered plug 1 which carries the electric heater encased in metallic tubes 3 and the thermostat 12 housed within casing 14, is centrally recessed as represented at 58 and terminates in an inwardly extending annular projection 59 which passes through the aperture 60 in housing 8. In order to secure the plug 1 with respect to housing 8, the annular projection 59 is outstruck at spaced intervals as represented at 59a, 59b and 59c, thereby connecting the plug 1 and housing 8. The bracket member 7, having flat base portions 7a as heretofore explained, is supported on an inwardly extending projection 59, and is secured to the plug 1 by means of coupling screw 61. Coupling screw 61 has a recessed head 62 which is engageable by a suitably shaped socket wrench for turning screw 61 after it has been inserted through aperture 7c in the flat base portion 7a of bracket 7. As screw 61 enters the screw-threaded recess 63 in plug 1 and by tightening coupling screw 61 against the inner face of the flat base portion 7a of bracket member 7, the bracket member 7 and the appurtenances carried thereby are solidly fastened within the housing 8. Three apertures are provided in the flat base portion 7a as represented at 64, 65 and 66, for the passage of the case 14 of the thermostat 12 and the ends of the tube enclosing the electric heater 3, as shown more clearly in Figs 7 and 10. The assembly thus provided insures the extension of the ends of the electric heater terminating at 5 and 6 sufficiently beyond the interior of the bracket to enable electrical connections to be made to the terminal block 23 interiorly of the housing, without short circuit to the housing. The switch assembly within the cradle 10 is arranged as heretofore described and operation of the switch is effected as set forth more clearly in Figs. 14-17.

As illustrated in Figs. 1, 2 and 4, there is a thermal conductive metallic band 67 conductively connected with the casing 14 of the thermostat 12 and connected with both portions of the tubular housing 3 forming part of the loop 4. This thermally conductive metallic band 67 has a width sufficient to provide a heat flow path from the electric heater to the thermostat, so that under conditions where the water level may drop too low in the tank represented in Figs. 3 and 4, the increase in temperature will be communicated to the thermostat to enable the thermostat to promptly expand and effect a cut-off of the power circuit through the electric heater. The metallic band 67 has a width substantially equal to the sum of the diameters of the casing of the metallic tube 3 and the diameter of the casing 14 which encloses thermostat 12, with a spacial distance between the thermostat housing 14 and the metallic tubular casing 3 not exceeding the diameter of the casing 3 of the electrical heating element. With this width for the thermal link 67, I have found that the heat flow is sufficiently retarded to prevent recycling of the heater too often, and at the same time provide sufficient protection to the electrical heating element so that should the electrical heating element become uncovered by reason of drop in water level within the boiler, the rise in temperature of the heater element will be communicated to the thermostat with sufficient rapidity to insure cut-off of the heater before the heater can be injured.

The adjustments of the calibrated dial provided by the slotted cover of the housing 8 as shown in Fig. 12, insure convenient setting of the control switch to operate over a predetermined temperature range for insuring maintenance of a hot water supply in an installation such as depicted in Fig. 3 at a predetermined set temperature.

I have found the construction of my invention highly practical and successful in operation, but I realize that modifications may be made in construction and arrangement of components in the heater and thermostat, and I desire that it be understood that no limitation upon my invention is intended other than may be imposed by the scope of the appended claims.

What I claim as new and desire to secure by Letters Patent of the United States is as follows:

1. In a composite electric heater and thermostatic control device a housing, an electric heater and thermostatic device carried by said housing and projecting therefrom, a bracket member within said housing, said bracket member being substantially U-shaped in section including a pair of spaced side portions and an intermediate connecting portion with said electric heater and thermostatic device extending through one of the side portions of said bracket, an adjusting screw carried by the other side portions of said bracket, a cradle journalled on said bracket intermediate the side portions thereof, and a control switch carried by said cradle, the said thermostat being engageable with said control switch adjacent one end of said cradle and the adjusting screw adjacent the opposite end of said cradle.

2. A composite electric heater and thermostat comprising a bracket support having a pair of substantially spaced parallel extending portions interconnected by a wall portion, a pivot member carried by said wall portion, a cradle journalled on said pivot member, a switch carried by said cradle including a casing and make and break contacts within the casing, a plunger extending through said casing and controlling said contacts a calibrated tension adjusting screw extending through one of said parallel extending portions of said bracket adjacent one end thereof and adjustably engageable with said cradle, and a thermostat extending through the other of said parallel extending portions of said bracket and engageable with said plunger for operating the contacts of the switch carried by said cradle, said adjusting screw being adjustable to variably displace the contacts of said switch with respect to said thermostat.

3. In a composite electric switch and heater a housing, a bracket mounted in said housing, said bracket including a pair of spaced, substantially parallel extending portions interconnected by a wall portion, a cradle pivotally mounted with respect to said wall portion and extending between said substantially parallel extending portions, a pressure actuated switch mounted in said cradle including a casing and make and break contacts within the casing, a plunger extending through said casing and controlling said contacts, a thermostat extending through one of the substantially parallel extending portions of said bracket and adjacent one end thereof and engaging the plunger of said pressure actuated switch, an adjusting screw extending through the other of said substantially parallel extending portions of said bracket adjacent the other end of said cradle and variably engageable with said cradle for adjusting the spacial relation of the casing of said pressure actuated switch with respect to said thermostat.

4. A composite thermostat and electric switch as set forth in claim 3 in which a calibrated dial is carried by said adjusting screw for pre-setting said cradle to predetermined spacial positions for selectively relating the casing of said pressure actuated switch to said thermostat for operation of said plunger by said thermostat for predetermined expansive conditions thereof.

5. A composite thermostat and electric switch as set forth in claim 3 in which said adjusting screw carries a calibrated dial located within said housing and having graduations thereon visible through a portion of said housing and controllable for pre-setting said cradle to predetermined positions with respect to said thermostat and in which said calibrated dial carries means for adjustably controlling said dial through the exterior of said housing.

6. In a composite electric heater and thermostat a housing, a bracket supported interiorly of said housing and including a pair of substantially spaced parallel extending portions interconnected by a wall portion, a channel shaped cradle journalled in the wall portion of said bracket and rockable between said substantially parallel extending portions thereof, a pressure actuated switch mounted within said channel shaped cradle and including a pressure actuating linearly movable member depending therefrom and toward one of the substantially parallel extending portions of said bracket, a thermostat and heater extending through the last mentioned portion of the bracket, the thermostat being aligned with the pressure actuating linearly movable member of said pressure actuated switch, an adjusting screw carried by the other of the substantially parallel extending portion of said bracket and operative to variably engage the opposite end of said cradle for predetermining the displacement of the pressure actuating linearly movable member of said pressure actuated switch with respect to the end of said thermostat, and means for biasing said cradle in a direction against said adjusting screw.

7. In a composite electric heater and thermostat, a housing, a bracket supported interiorly of said housing and including a pair of substantially parallel extending spaced portions interconnected by a wall portion, a channel shaped cradle journalled in the wall portion of said bracket and rockable between said substantially parallel extending spaced portions thereof, a pressure actuated switch mounted within said channel shaped cradle and including a pressure actuating linearly displaceable member depending therefrom and toward one of the substantially parallel extending portions of said bracket, a thermostat and heater extending through the last mentioned portion of the bracket, the thermostat being aligned with the pressure actuating linearly displaceable member of said pressure actuated switch, an adjusting screw carried by the other of the substantially parallel extending portion of said bracket and operative to variably engage the opposite end of said cradle for predetermining the displacement of the pressure actuating linearly displaceable member of said pressure actuated switch with respect to the end of said thermostat, and a spring anchored in the first mentioned parallel extending portion of said bracket and engaging said cradle for normally urging said cradle in a direction toward the adjusting screw carried by the other of said substantially parallel extending portions of said bracket.

8. In a composite electric heater and thermostat a supporting structure, a heat conductive tube mounted in said supporting structure and enclosing a thermostat therein, an electric heater including a heat conductive casing spaced from the heat conductive tube which enclosed said thermostat, and a heat conductive band interconnecting said tube and said casing, said band having a width substantially equal to the diameter of the tube enclosing said thermostat and the diameter of the casing enclosing said electric heater, with a spacial distance between the tube enclosing the thermostat and the casing enclosing the electric heater not exceeding the diameter of the casing which enclosed the electric heater for effecting a heat flow path from the electric heater to the thermostat.

9. A composite electric heater and thermostat comprising a housing, a plug forming a support for a thermostat and an electric heater in which the said thermostat and electric heater are housed within tubes, a recess in said plug through which the said tubes extend into said housing, a plurality of angularly displaced lugs extending from said plug and fastened over said housing for securing said plug in said housing, a bracket positioned interiorly of said housing with the said thermostat and electric heater tubes extending therethrough, a screw device extending through said bracket and into a screw-threaded aperture in the recess formed in said plug for detachably fastening said bracket to said plug, and a pressure actuated electric switch device pivotally mounted on said bracket and controlled by the thermostat which extends through said bracket.

NATHAN MORRIS.

REFERENCES CITED

The following references are of record in the file of this patent:

UNITED STATES PATENTS

| Number | Name | Date |
|---|---|---|
| 1,750,907 | Skold | Mar. 18, 1930 |
| 2,039,641 | Fichtner | May 5, 1936 |
| 2,128,809 | Fogg | Aug. 30, 1938 |
| 2,163,801 | Newell | June 27, 1939 |
| 2,180,643 | Mullin | Nov. 21, 1939 |
| 2,258,835 | Williams | Oct. 14, 1941 |
| 2,446,555 | Sage | Aug. 10, 1948 |
| 2,479,587 | Morris et al. | Aug. 23, 1949 |